United States Patent [19]

Costa

[11] 4,250,032
[45] Feb. 10, 1981

[54] PROCESS FOR THE DISPOSAL OF BAUXITE PROCESSING WASTES AND THEIR CONTAINMENT INTO FILLING BASINS

[75] Inventor: Giuseppe Costa, Rome, Italy

[73] Assignee: Eurallumina S.p.A., Portoscura, Italy

[21] Appl. No.: 17,484

[22] Filed: Mar. 5, 1979

[30] Foreign Application Priority Data

Jul. 31, 1978 [IT] Italy .................................. 50535 A/78

[51] Int. Cl.³ ........................... C02F 1/66; C02F 11/14
[52] U.S. Cl. ..................................... 423/121; 210/769; 210/772; 423/111; 423/131; 210/765; 210/806
[58] Field of Search ................... 106/286.8; 210/42 R, 210/45, 59, 60, 66, 67, 69, 70, 73 R, 75, 77, 79, 81, 83, 170; 405/129, 263; 423/111, 121, 131

[56] References Cited

U.S. PATENT DOCUMENTS

| | | | |
|---|---|---|---|
| 2,335,373 | 11/1943 | Woodward | 210/70 |
| 2,992,893 | 7/1961 | Soudan et al. | 423/121 |
| 3,120,996 | 2/1964 | Porter | 423/131 |
| 4,113,833 | 9/1978 | Eremin et al. | 423/131 |

*Primary Examiner*—Peter A. Hruskoci
*Attorney, Agent, or Firm*—Eyre, Mann, Lucas & Just

[57] ABSTRACT

The invention relates to a process for the disposal of bauxite processing wastes comprising the steps of:
 (a) filtering the bauxite muds in suspension coming from the washing decanter,
 (b) continuously washing the dehydrated filtration cake on the filter with hot water with recycling of the liquid phase containing the greater part of the soda into the basic chemical process of the bauxite treating plant.
 (c) treating the mud cake separated from the filter with sea water to refluidizing the muds and to neutralize the soda residues still present; and
 (d) conveying the inert and neutralized mud suspension, mixed with sand residual from bauxite processing in filling basins; the invention relates also to a containment basin for the exhausted bauxites obtained with the process constituted of several basin units, singularly comprising a trapezoidal cross-sectioned containment structure or embankment, elevated above sea level, with inner core of permeable sand, lined with "tout-venant" broken rocky material, contained on the outside by large dimension boulders, on the upper part of which is placed the distribution piping of the muds, with introduction of these latter in the basin unit in several different points and provided with a drainage layer on the base.

7 Claims, 3 Drawing Figures

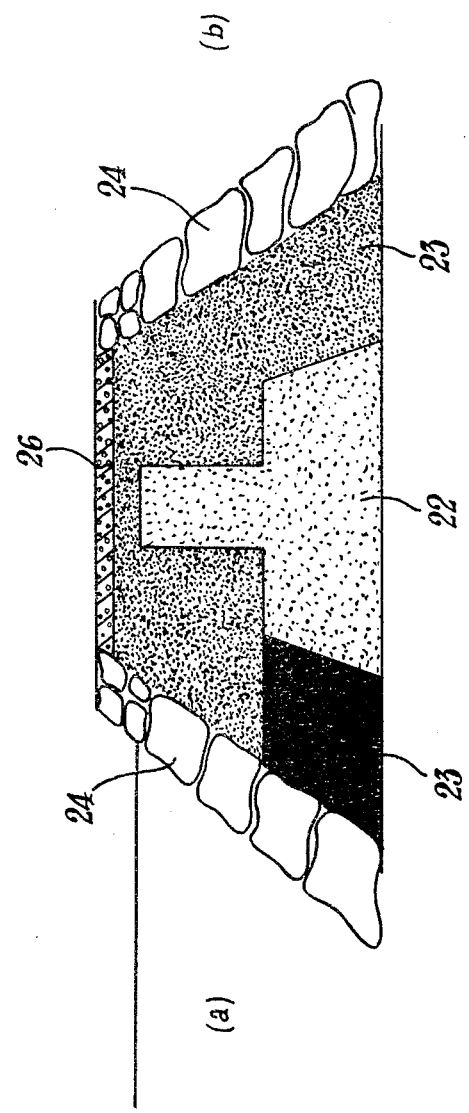

PROCESS FOR THE DISPOSAL OF BAUXITE PROCESSING WASTES AND THEIR CONTAINMENT INTO FILLING BASINS

The object of the present invention is a process for the disposal of bauxite processing wastes and their containment into filling basins. In particular the invention is related to a process wherein the disposal operation is associated with the recovery operation of soda contained in the wastes and with the subsequent neutralization by sea water of the soda fraction eventually still present before the introduction into filling basins, with high characteristics of containment and drainage.

As it is well-known, the elimination of residual materials of bauxite processing, as for example in the well-known Bayer process, has always constituted an onerous problem in the aluminium production industry, above all for the very high amount of the waste mass, for example up to three times that of the alumina produced.

In order to solve this problem various technics have been suggested for the utilization of said residues, both for the extraction of industrially significant compounds and for their use as construction materials, etc.

However, no economically satisfactory results have been supplied up to the present by these technics.

Now, therefore, the industry employs disposal technics of the exhausted bauxites preferably carried out by dumping into sea of superficial waters, on the ground or underground.

The system of dumping into water, in any case costly, presents ecological risks, with the exception of morphologically suitable zones, while that of dumping on the ground, to be effected on geologically and climatically fit grounds and in any case far from human settlements and free from facilities, has not allowed up to the present fillings with satisfactory consolidating characteristics, without harmful consequences for the environment due to the nature and composition of the muds discharged.

Therefore the object of the present invention is to carry out a process for the disposal of the bauxite processing wastes, which eliminates or reduces substantially the above said drawbacks, introducing specific advantages from a functional and economical point of view.

To this purpose, a process for the disposal of the bauxite processing wastes is proposed by the instant invention, wherein the bauxite muds in suspension are mechanically filtered at the plant with a contemporaneous recovery, through the continous washing of the filtration cake, of the soda to be recycled into the alumina production process, and subsequent re-fluidification of said cake with sea water in order to neutralize the soda residues still contained in the cake and to obtain a slush easily conveyable into the filling basin.

It is evident that with this process a positive and immediate recovery of the soda present in the bauxite suspension muds is introduced, with remarkable technical and economical improvement in the trend of the basic process both because the soda is recovered still in an active form, and because in consequence of the aforesaid re-fluidification operation with sea water, the muds which are conveyed into the basin are made completely inert and neutralized, and can thus satisfy every environmental and ecological safety requirement.

The technical solution proposed by the present invention appears to eliminate the basic drawbacks of the already known disposal technics of ground dumping and in particular those concerning the soda recovery from the drainage and decantation waters of the basins, wherein soda carbonation phenomena are present, with alteration of the characteristics necessary for its re-utilization in the basic process.

Another advantage of the process according to the present invention is that of having available a less corrosive material with respect to the pipes of introduction to the filling basins, owing to the neutralization of the soda residues in the suspension of the discharge muds.

Finally, the structurization and the setting of the filling basin wherein the muds discharged from the basic plant according to the aforesaid procedures are conveyed, are such as to warrant both the disposal of the bauxite processing wastes for the entire foreseen productive cycle and the possibility to realize the land reclamation and industrial development, with the restitution of previously marshy or low areas to industrial or urban settlement.

Granted that the morphological characteristics of the installation zone of the filling basin must in general satisfy the necessary conditions for a rapid drainage of the muds and in particular they must guarantee a sandy bottom with no outcropping of rocks or lithoidal formation, the essential characteristics of the filling basin are, according to the present invention, the use of an introduction of the muds into the filling basin in several points, in order to obtain a more uniform distribution and evaporation, the choice of a containment structure or embankment with a trapezoidal cross-section, constituted by a duly premeable sand core lined with broken rocks and embanked by a dry revetment of cyclopean boulders, the introduction of a draining stratum which reduces the static height towards the outer base of the embankment thus avoiding the phenomena of sheetwashes passing through on the outer facing.

This structure, very different from the usual earth embankments or dams, eliminates the drawbacks of the above mentioned basins previously used for the ground disposal of bauxite residues allowing the solid phase of muds to be stably contained and favours the drainage of the liquid one.

Among the specific advantages of such a setting, besides the rapidity of the drying of the muds, it must be mentioned the uniform solidity of the area of the filling and the high "yield" of the basin which allows a reduction of the volume of the mud introduced to about ¼ in the foreseen period of the plant life.

The object therefore of the present invention is a process for the disposal of the bauxite processing wastes, characterized by the following steps:

(a) to filter the suspension muds of bauxite coming from the washing decanters;

(b) to wash continuously the dehydrated filtration cake on the filter with hot water, recycling the liquid phase containing the greater part of soda into the chemical base process of the plant for the treatment of bauxites;

(c) to treat the mud cake separated from the filters with sea water in order to re-fluidize the muds and neutralize the soda residues still present; and (d) to convey the inert and neutralized mud suspension, admixed with the residual sand of the bauxite processing, into filling basins.

It is now desired to emphasize that the entire operation of filtration, washing, neutralization of the muds, is performed at the bauxite processing plant itself.

Preferably rotating filters, operating under vacuum, each one having a 100 sq. m surface are used. The treatment of the filtration cakes, separated from the filters, with sea water occurs in suspension tanks, supplied with stirrer. As already mentioned, besides re-fluidizing the muds, the sea water reacts with the soda present in them and neutralizes it. Preferably a mixture containing 34–40% of solids is obtained, which is transferred into reservoirs wherein it is admixed with sand previously washed and neutralized, that is also a residue of the bauxite processing.

The filling basins preferably three in number as previously said are built on sandy ground of high permeability.

Each filling basin unit for the collection and containment of the discharge muds treated as previously said, is characterized by a containment structure or embankment having a trapezoidal cross-section set above sea level, with an inner core of permeable sand, lined with a layer of "tout-venant" broken rock, embanked on the outside by boulders of large size, on the top of which is set the distribution pipe for the muds, with introduction of these into the basin by means of several inlets and supplied with a drainage layer on the base.

Preferably the layer of "tout-venant" broken rock is of about 1 m thick and the boulders for the outer containment, for example trachyte boulders, weigh 1–3 ton.

Such a structure appeared to be particularly fit to satisfy the main parameters planned for guaranteeing the solution of the problem of the containment and the disposal of the exhausted bauxites, and precisely:

(1) how to contain on a flat ground the solid part of the exhausted bauxites, by realizing a containing perimeter constituted by a stable structure, elevated up to 10 m above ground level and premeable to the liquid part of the same ones;

(2) how to consolidate uniformly, in the shortest period of time, the filling surface, obtaining an average 1.5 kg/sq. cm load-bearing;

(3) necessity of introducing into the basin 30 millions cu.m. of muds containing exhausted bauxites, with an average of solid content of about 30% by weight and with an average density equal to about 1.25 ton/cu.m.

In particular, with regard to the afore said point (1), the following parameters are satisfied:

formation of conoids at the discharge outlets of the muds into the basin with an average slope of 1/150;

decantation velocity of part of the liquid of the muds, equal to about 3 liters per sq.m/hour;

drainage velocity on the inside of the bulk of the muds deposited into the basin, equal to about 0.4 liters per sq.m/hour; and drainage velocity of the basin bottom and of the embankment facings equal to 300 liters per sq.m/hour, that is a velocity 750 times greater than that of the mud.

In this case the maximum dimensions of the trapezoidal cross-section are: major base 35 m; minor base 5 m; height 10 m, while the average cross-section of the 4700 m perimeter is about 120 sq.m.

Tests performed on pilot basins of the aforesaid type have shown, concerning point (2), among other things, that the percentage of solids present in the mud doubles in very short times, owing to the liquid phase drainage in the external stratum to the basin.

Inasmuch as the surface of the muds thus dehydrated is directly exposed to the evaporation, for each layer which is formed on the discharge conoids, a drying equal to a solid content of up to 75–80% is reached, more than sufficient to guarantee the load-bearing required.

The tests have further shown that it was possible to obtain the drying by subsequent layers of the various conoids which were alternatively formed around the numerous discharge tips, open accordingly to a sequence and a duration pre-established by a convenient filling plan.

Finally, with regard to point (1), it has been confirmed that the process allowed the reduction of the volume of the mud introduced to a little more than ¼; so that the basin capacity was limited to 8 millions cu.m fit to contain 30 millions cu.m of mud, to be poured in a period of 15 years.

In particular it can be foreseen that each basin should be filled on the average up to 9.50 m of height above sea level, 10 m being the elevation of the upper part of the embankment above sea level. In order to reach this elevation of dry mud in the last years of the life of each basin, the discharge into this basin is alternated with that made into the subsequent basin, built in the meanwhile, to allow the consolidation of the mud poured.

The thickening of the mud will thus make available a further volume for a subsequent filling up to a complete filling of the basin itself. By considering, for example, the parameters obtained by the operation of pilot basins of this type, and of a metereological station purposedly built, that is:

year evaporation per sq.m (about 2000 liters/sq.m/year);

year percolation per sq.m (⅓ of the evaporation);

rest angle of the mud above the liquid level (1.5%); and rest angle of the thickened mud below the liquid level (0.7%) and also considering the configuration of the ground related to the filling basins and flow rate of the discharge of muds, it can be foreseen that at the beginning of the filling there will be a head of liquid of a good many cm above the thickened mud, in the points furthest away from those of the discharge.

This head will vary as the mud, little by little, occupies all the bottom of the basin, exposing a continuously increasing surface to the evaporation and percolation.

When the whole surface of the basin will be taken up by these phenomena it is foreseen that the head of liquid, variable according to seasons, will not exceed 1 m in height at the points furthest away from those of discharge.

Once completely filled up, the basins will be left standing for about 3–4 months, thus allowing for the drying of the mud; then the surface of the mud, by now dried, will be covered with sand, to avoid pulverization of same by wind action.

The present invention will be now described with particular reference to the attached drawings, wherein preferential embodiments thereof are reported for illustrative but not limitative purposes.

In the drawings, in particular:

FIG. 3 represents a cross-sectional view of the upper body of the structure according to FIG. 2.

Figure 1:
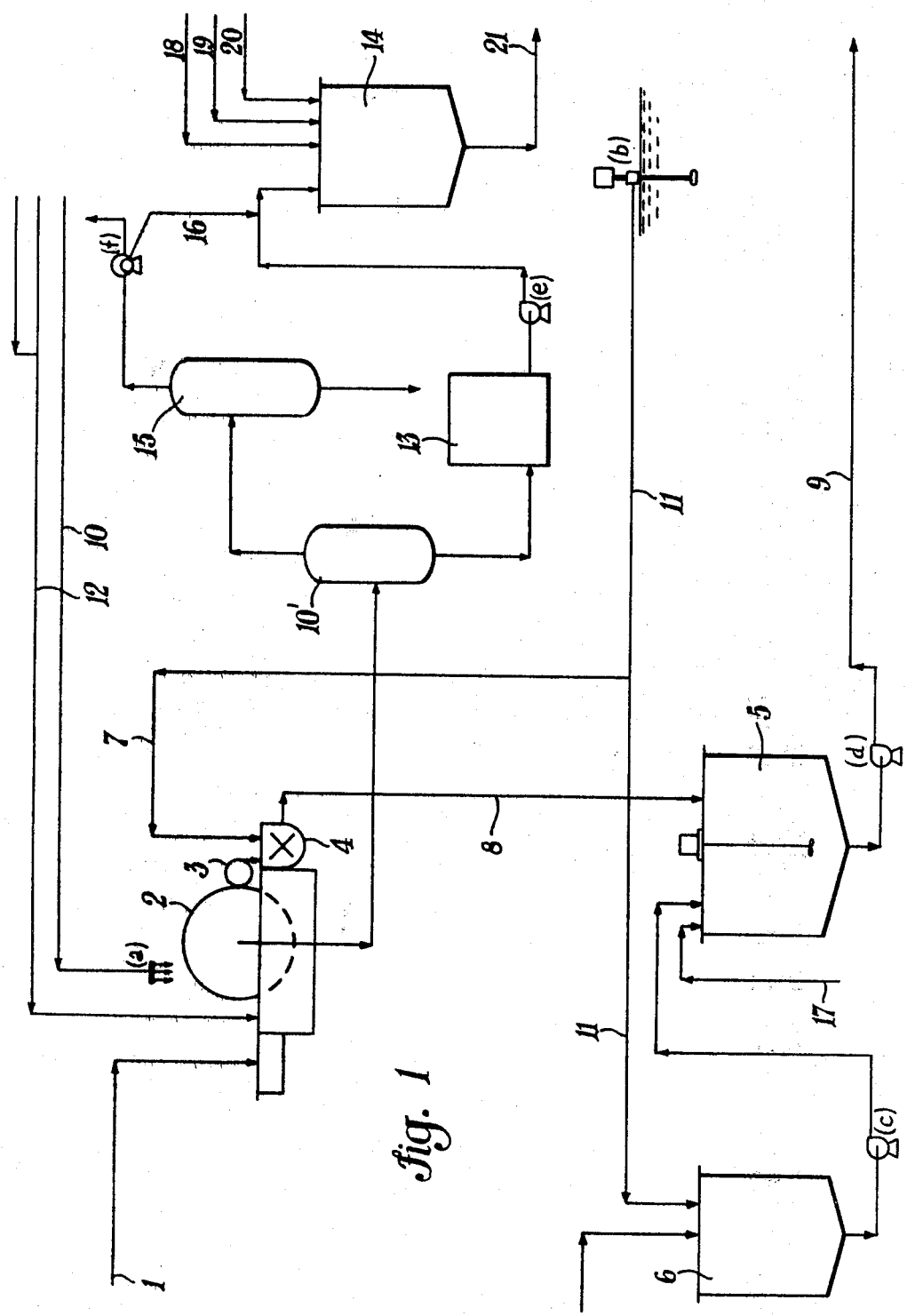
FIG. 1 represents a lay out of the filtration process of the muds, according to the present invention.

With particular reference to FIG. 1 of the attached drawings, one sees the filter assembly 2 which comprises a group of filters (not shown), wherein the red muds of exhausted bauxites are treated, eventually fed together with a small amount of white muds (oxalates) from pipe 1 into the tank of said filtration group. The filter rotates at a speed between 20 and 162 r/p/h, varying according to the required capacity of filtration and controllable through the level height of the filtration tank. The washing of the filtration cake is performed with water fed by pipe 10 and conveyed both to the low pressure sprayers (a), located on the upper part of filter 2, and to the high pressure sprayers (not shown in figure) which wash the cake as soon as formed. Soda and hydrochloric acid, conveyed through pipe 12 are also fed into the tank of the filtration group 1. A water washing (not shown) of the filtration canvas is also performed in a discontinuous way, by means of a timer.

Sea water, in a constant ratio to the amount of the mud (about 0.25 cu.m of sea water for each cu.m of mud) is fed, under the action of pump (b), through pipes 11 and 7, to the masher screw conveyor 4, wherein the filtration cake (3) is discharged.

The mashed mud, diluted with sea water, is discharged from the screw conveyor overflow and conveyed through pipe 8 into the homogenizer tank (5) wherein is added with the suspension 6 of sand with sea water coming from the dilution tank (pipe 11) under the action of pump (c). The muds are then discharged from homogenizer 5 and conveyed to the filling basin, under the action of pump (d), through pipe 9. It should be observed that acid residues of the working process of bauxites are also fed into the homogenization tank 5 through pipe 17. The level control in the homogenization tank 5 is performed by varying the number of revolutions of the muds transfer pump, by direct action on the D.C. motor which operates the same.

The addition (not shown) of further sea water to adjust the mud density to the desired value (about 1.3 kg/liter), is also foreseen.

The pH of the treated mud is continuously measured with a pH-meter placed on an offtake of pipe 9 of muds towards the basins. The filtrate coming out of the bottom of the tank of the filtration group is conveyed into the filtrate receiver 10' through liquid-tight barometric tubes and from there into the filtrate accumulator 14, under the action of pump (e), after being collected into filtrate reservoir 13.

The level control in the filtrate accumulator 14 is performed by throttling the delivery of the filtrate pumps. Two filtrate accumulators 14 (the second not shown) are used, which are operating in parallel, that is non-intercepting the balance connection; this connection will be intercepted only in case of maintenance of one of the two filtrate receivers (only one shown).

The vacuum system consists of a collector (not shown) which collects the air coming from the separators of the single filters and of a droplet separator 15 which subtract from the air the water that it drags in, in order to avoid the "soiling" of the vacuum pumps and convey the separated water, through pump (f) and pipe 16 into filtrate accumulator 14. The filtrate collected in 14, to which is added Lurgi water, the process water and the bad condensate through pipes 18, 19 and 20 respectively, is thereafter discharged through pipe 21.

In a particular project embodiment, it turned out that a muds treatment unit of the type described was fit to treat an amount of 207 ton/hour of red muds having the following characteristics:

| solid content | 28% by weight |
| --- | --- |
| density | 1.24 ton/cu.m |
| soda concentration | 9.7 g/liter |
| temperature | 80° C. |

The sand sent to the disposal, after the addition of sea water, has the following characteristics:

| flow rate | 26 ton/hour |
| --- | --- |
| density | 1.11 ton/cu.m |
| solid content | 15% by weight |
| temperature | room temperature |

Normally six rotating filters of which four in operation and two stand-by ones are provided with the intention of guaranteeing the continuity of the operation.

Figure 2:
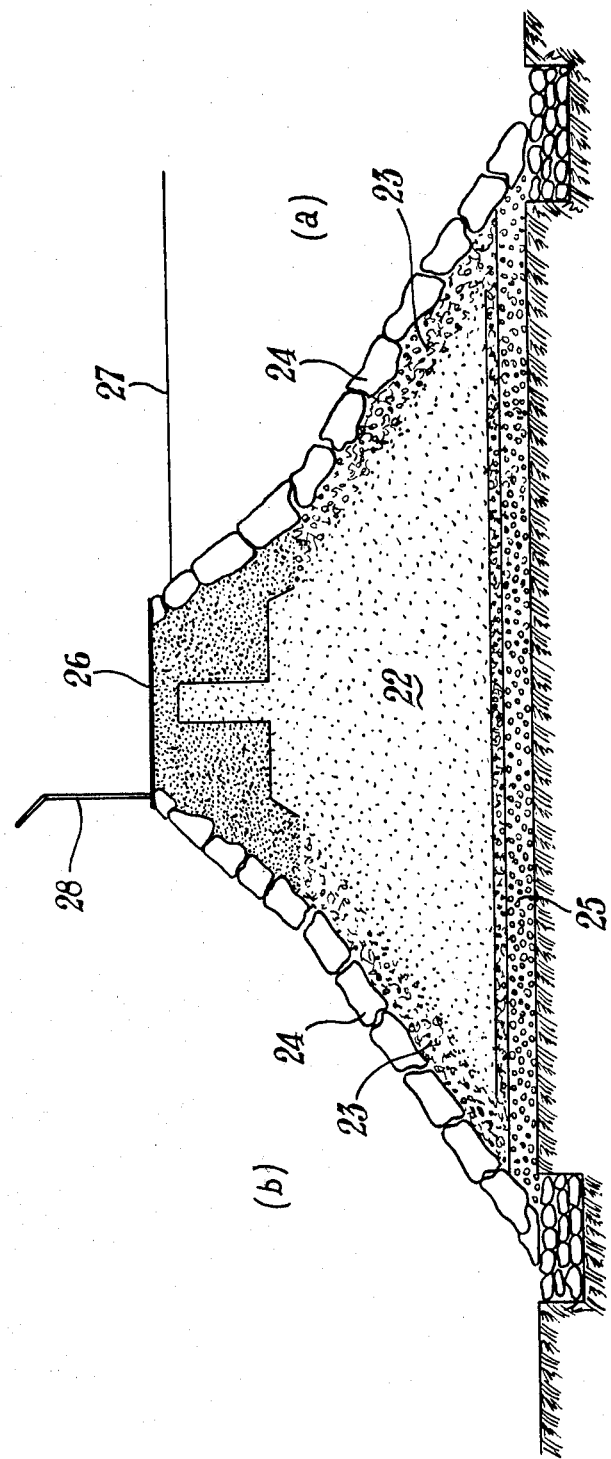
FIG. 2 represents a cross-sectional view of the containment structure of the filling basin according to the invention.

Referring now to FIGS. 2 and 3 of the attached drawings, one can see the structure of the trapezoidal cross-section containment embankment of the filling basin, consisting of a core 22 of permeable sand lined with a drainage layer 23 of "tout-venant" broken rock, about 1 meter thick and contained by 1-3 ton trachyte boulders, placed in mosaic-like way, constituting the outer facings of the embankment. A horizontal drainage layer 25 is designed to be built on the base in order to hinder the risk of sheet-washes passing through on the outer facing of the embankment by reducing the static height towards the base on the outside of the embankment. The embankment body terminates on the upper part (see in particular FIG. 3) with the upper road structure 26 wherein the feeding pipes (not shown) for the muds are located. The maximum elevation 27 of the muds in the inner part (a) of the basin is a little lower than the embankment's upper one. An enclosure 28 is planned from the outside (b) of the embankment on the plan of the upper road structure 26.

The present invention has been described with particular reference to specific embodiments thereof, but it is intended that modifications or variations could be introduced therein, without departing therefore from the protection limits of the present industrial patent.

What we claim is:

1. A process for the disposal of bauxite processing wastes containing soda from a bauxite treating plant comprising:
   (a) preparing a suspension of said wastes in a washing decanter;
   (b) filtering the suspension of bauxite muds to form a filtration cake;
   (c) continuously washing the filtration cake on the filter with hot water to form a liquid phase having the greater part of the soda;
   (d) recycling the liquid phase into the basic chemical process of the bauxite treating plant;
   (e) separating the mud cake from the filter and treating each cubic meter of mud with about 0.25 cubic meters of sea water to refluidize the mud as a mud suspension with a solids content of about 35-40% and to neutralize any remaining soda;

(f) forming an admixture of the refluidized, neutralized suspension with sand residual from the bauxite processing;

(g) conveying the admixture to filling basins;

(h) adding sea water to the admixture until a density of about 1.3 kg/liter is achieved.

2. Process according to claim 1, characterized by the fact that the filtration is performed with rotating filters under vacuum.

3. Process according to each of the claim 1, characterized by the fact that the washing with hot water is performed in part at high pressure on the cake just formed and in part at low pressure on the upper part of the filter.

4. Process according to claim 1, characterized by the fact that the sand before being added to the suspension of the muds derived from the neutralization phase, is diluted with sea water.

5. Process according to claim 1, characterized by the fact that six rotating filters are used, of which four are in operation.

6. Process according to claim 1, characterized by the fact that a suspension residual from bauxite processing, consisting of red muds and white muds (oxalates) is the waste treated.

7. Process according to claim 1, characterized by the fact that the filter is connected to a vacuum system consisting of a collector which collects the air coming from an air-liquid separator.

* * * * *